United States Patent
Nguyen et al.

(10) Patent No.: US 9,807,726 B1
(45) Date of Patent: Oct. 31, 2017

(54) USE OF LOW ENERGY BLUETOOTH BEACONS TO LOCATE FIELD EQUIPMENT AND PERSONNEL

(71) Applicant: YOKOGAWA ELECTRIC CORPORATION, Tokyo (JP)

(72) Inventors: Vien Nguyen, Sugar Land, TX (US); Patrick Clay, Sugar Land, TX (US); Andrew Keller, Sugar Land, TX (US); Akio Umezawa, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/360,203

(22) Filed: Nov. 23, 2016

(51) Int. Cl.
*H04W 64/00* (2009.01)
*H04W 40/24* (2009.01)
*H04L 29/08* (2006.01)

(52) U.S. Cl.
CPC ............. *H04W 64/00* (2013.01); *H04L 67/18* (2013.01); *H04W 40/244* (2013.01)

(58) Field of Classification Search
CPC .... H04W 64/006; H04W 24/02; H04W 84/12
USPC ............ 455/404.1, 404.2, 411, 456.1, 456.2, 455/456.3; 340/539.13, 573.4, 815.4
See application file for complete search history.

(56) References Cited

U.S. PATENT DOCUMENTS

| | | |
|---|---|---|
| 2015/0287318 A1 | 10/2015 | Nair et al. |
| 2016/0077186 A1* | 3/2016 | Snapp ................... G01S 5/0231 455/404.2 |
| 2016/0100282 A1* | 4/2016 | Pounds ................ H04W 4/008 455/456.1 |
| 2016/0286361 A1* | 9/2016 | Ciecko .................. H04W 4/028 |
| 2017/0026788 A1* | 1/2017 | Kostka ............... G06Q 30/0633 |

OTHER PUBLICATIONS

Junya Suzuki, "Beacon utilization cases for wholesalers other than push notification as seen in US exhibition in NY—IT Journalist." iBeacon & BLE Technology, http://beaconlabo.com/2015/02/470/. accessed Feb. 20, 2017 (13 pages).

(Continued)

*Primary Examiner* — Cong Tran
*Assistant Examiner* — CongVan Tran
(74) *Attorney, Agent, or Firm* — Osha Liang LLP

(57) ABSTRACT

A management system for a plant facility is disclosed. The system includes a server, a mobile terminal, and beacon transmitters. The beacon transmitter is attached to or embedded into a field device in the plant facility and broadcasts a beacon signal including an identifier of the field device. The server includes a display, a storage that stores process data corresponding to the identifiers, and a controller that receives wireless signals including the identifiers from the mobile terminal and identifies the process data corresponding to the identifiers received with the wireless signals. The mobile terminal includes a display, a beacon receiver that receives the beacon signals, and a controller that transmits the wireless signals to the server with the identifiers received with the beacon signals. At least one of the displays of the server and the mobile terminal displays the process data identified by the controller of the server.

20 Claims, 10 Drawing Sheets

(56) References Cited

OTHER PUBLICATIONS

Yoshiaki Kataoka, "People flow analysis using iBeacon, 300 beacon transmitters installed in PARCO, Nagoya." Impress Corporation, http://internet.watch.impress.co.jp/docs/column/chizu/662154.html. Accessed Mar. 29, 2017 (14 pages).
BLE Device Monitor User Guide. Retrieved Apr. 5, 2017 from the Texas Instruments Wiki: http://processors.wiki.ti.com/index.php/BLE_Device_Monitor_User Guide (7 pages).
SimpleLink™ Bluetooth low energy/Multi-standard SensorTag. Retrieved Apr. 5, 2017 from the Texas Instruments Wiki: http://www.ti.com/tool/cc2650stk (4 pages).

* cited by examiner

| | |
|---|---|
| 1FIC101 | 3 meters |
| 1FIC107 | 10 meters |
| 1TIC104 | 12 meters |
| 1FIC201 | 18 meters |
| 1TIC131 | 36 meters |
| 1TIC118 | 40 meters |
| 1FIC107 | 47 meters |

Description: Temperature Controller

Temp.     : 40 °C

FIG. 6

USE OF LOW ENERGY BLUETOOTH BEACONS TO LOCATE FIELD EQUIPMENT AND PERSONNEL

BACKGROUND

The present invention generally relates to a management system for a plant facility and a method for managing the plant facility.

A plant or a factory (hereinafter collectively referred to as "plant") commonly utilizes a process control system to implement advanced automatic operations. The process control system controls various types of process data (e.g., pressure, temperature, flow quantity, etc.) in an industrial process. To secure safety and perform advanced control, the process control system is equipped with a control system such as a distributed control system (DCS) and a safety system such as a safety instrumented system (SIS).

In a DCS, a plurality of field devices (e.g., a measurement device and a manipulation device) each communicate with a control device for controlling the field devices through a network. The control device in the DCS collects measurement data measured by the field devices, and operates or controls the field devices in accordance with the collected measurement data, in order to control various types of process data.

The control device of the DCS may be accessed from an operation monitoring terminal operated by an operator for monitoring the status of plant operation or behavior. The operation monitoring terminal includes a display such as a liquid crystal display, an input unit such as a keyboard and a mouse, and a communication device the operator uses to monitor the status visually. The operator can access the data collected in the DCS via the operation monitoring terminal to check the condition of the field device or the plant facility around the field device.

In case an abnormal value or problem is detected on the field device, a field worker working in the facility may need to identify its location and resolve the problem. Thus, tracking the location of the field device in the facility may be important for purposes of facility management, to ensure safety and operation efficiency. Additionally, identifying and tracking the field worker's location may be important for the productivity of maintenance activities and other routine business activities in the plant facility.

In general, a Global Positioning System (GPS) is known to locate a device or a person who holds the device. However, GPS is only suitable for outdoor position tracking where a fix on a satellite signal can be obtained, and is not suited for indoor use because microwaves from the satellites will be attenuated and scattered. For example, GPS cannot be used for tracking the field worker or the field device in a closed explosion-proof facility where microwaves are unable to reach the inside of the facility.

SUMMARY

One or more embodiments of the invention provide a management system for a plant facility, comprising: a server device; a mobile terminal that communicates with the server device; and a plurality of beacon transmitters, wherein each of the beacon transmitters is attached to or embedded into a field device in the plant facility and broadcasts a beacon signal comprising an identifier that identifies the field device, wherein the server device comprises: a server device display; a server device storage that stores process data corresponding to the identifiers; and a server device controller that receives wireless signals comprising the identifiers from the mobile terminal, and identifies the process data corresponding to the identifiers received with the wireless signals, the mobile terminal comprises: a mobile terminal display; a beacon receiver that receives the beacon signals; and a mobile terminal controller that transmits the wireless signals to the server device with the identifiers received with the beacon signals, and at least one of the server device display and the mobile terminal display displays the process data identified by the server device controller.

One or more embodiments of the invention provide a method for managing a plant facility, comprising: broadcasting beacon signals by a plurality of beacon transmitters, wherein each of the beacon transmitters is attached to or embedded into a field device in the plant facility, and each of the beacon signals comprises an identifier that identifies the field device; receiving the beacon signals by a mobile terminal; transmitting, from the mobile terminal to a server device, wireless signals with the identifiers received with the beacon signals; identifying process data stored in the server device corresponding to the identifiers received with the wireless signal; and displaying the process data on at least one of the server device and the mobile terminal.

Other aspects of the invention will be apparent from the following description and the appended claims.

BRIEF DESCRIPTION OF DRAWINGS

FIGS. 5-11 each show an implementation example of the management system in accordance with one or more embodiments of the invention.

DETAILED DESCRIPTION

Figure 1:
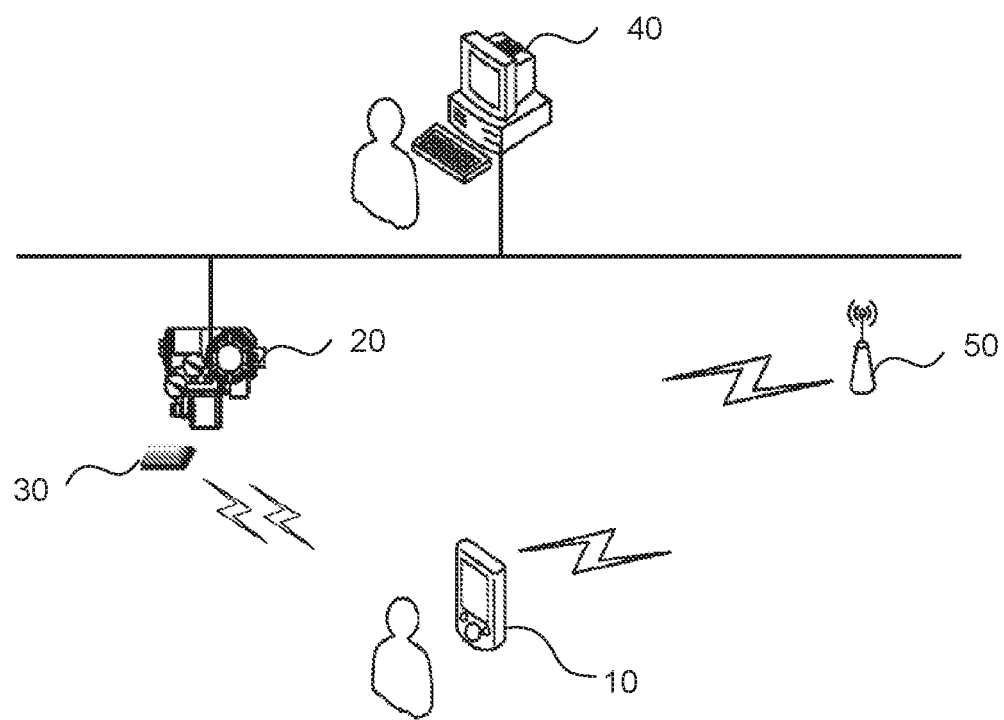
FIG. 1 shows a schematic view of a management system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a schematic view of a management system 1 in accordance with one or more embodiments of the invention. The management system 1 comprises a mobile terminal 10, e.g., a tablet device, a smart phone, a personal digital assistant (PDA), a laptop, or a wearable computer, held or worn by a field worker working at a plant facility; a field device 20, e.g., a pressure transmitter, a temperature transmitter, a flow meter, or a valve positioner; a beacon transmitter 30 attached to or embedded into the field device 20; a server device 40, which may be either the control device itself or a server that can directly or indirectly communicate with the control device of the DCS; and an access point 50, e.g., a wireless local area network (WLAN) router.

The mobile terminal 10 may be used by the field worker to locate the field device 20 or the mobile terminal 10 itself on a map of the plant facility. The mobile terminal 10 is also used for the field worker to access information about the field device 20. The mobile terminal 10 may wirelessly communicate with the server device 40 via the access point 50 and receive process data and other information from the server device 40.

Further, to locate the position in the plant facility, the mobile terminal 10 may receive a beacon signal broadcast from the beacon transmitter 30. In one or more embodiments of the invention, the beacon signal is broadcast in conformity with the standard of Bluetooth Low Energy (BLE). In one or more embodiments of the invention, for example, the beacon signal may reach up to seventy meters. The mobile terminal 10 may measure the strength of the beacon signal and calculate the distance from the beacon transmitter 30. In one or more embodiments of the invention, the mobile terminal 10 stores location data of the plant facility, which represents a map of the plant facility and the location of the beacon transmitter 30. Based on this location data and calculated distance, the mobile terminal 10 may calculate its current position in the plant facility with respect to the beacon transmitter 30.

The server device 40 may collect and store process data of the field device 20 and other data required to manage the plant facility. For example, the server device 40 may store temperature, pressure, flow rate, or valve status of the field device 20. The server device 40 may provide the mobile terminal 10 with such data via the access point 50. In one or more embodiments of the invention, the server device 40 manages the process data of the field device 20 with an identifier (hereinafter called "ID"). The ID is identification information associated with the field device 20. The ID may be conveyed from the attached or embedded beacon transmitter 30 to the mobile terminal 10 via the beacon signal. Alternatively, the ID may be associated with a universally unique identifier (UUID) broadcast by the beacon transmitter 30 via the beacon signal with a lookup dictionary or mapping mechanism/database. In this case, the server device 40 may specify the process data of the field device 20 based on the UUID with the lookup dictionary or the mapping mechanism/database.

In one or more embodiments of the invention, the process data may be formed as a table, which associates the process value and the ID of each field device 20. In one or more embodiments of the invention, the server device 40 may provide the process data to the mobile terminal 10 in response to a request for the process data of the field device 20 identified by the ID.

Although FIG. 1 shows a single mobile terminal 10 and a single pair of a field device 20 and a beacon transmitter 30, multiple mobile terminals 10 and pairs of the field device 20 and the beacon transmitter 30 may be included in the management system 1. In one or more embodiments of the invention, each of the beacon transmitters 30 is embedded into the field device 20. In this case, the beacon signals are used for both calculating the current position of the mobile terminal 10 and identifying a nearby specific field device 20. In other embodiments, all of the beacon transmitters 30 may be deployed at any location in the plant facility independent from the field device 20. In this case, the beacon signals transmitted by such beacon transmitters are used for calculating the current position by the mobile terminal 10, and none of the field devices 20 need be deployed around the plant facility. In yet other embodiments, some of the beacon transmitters 30 are each embedded into the field devices 20 while the other beacon transmitters 30 are deployed at various locations in the plant facility separately from the field devices 20. In this case, the mobile terminal 10 may identify a nearby field device 20 while calculating its current position even when the number of the deployed field devices 20 is small.

Figure 2:
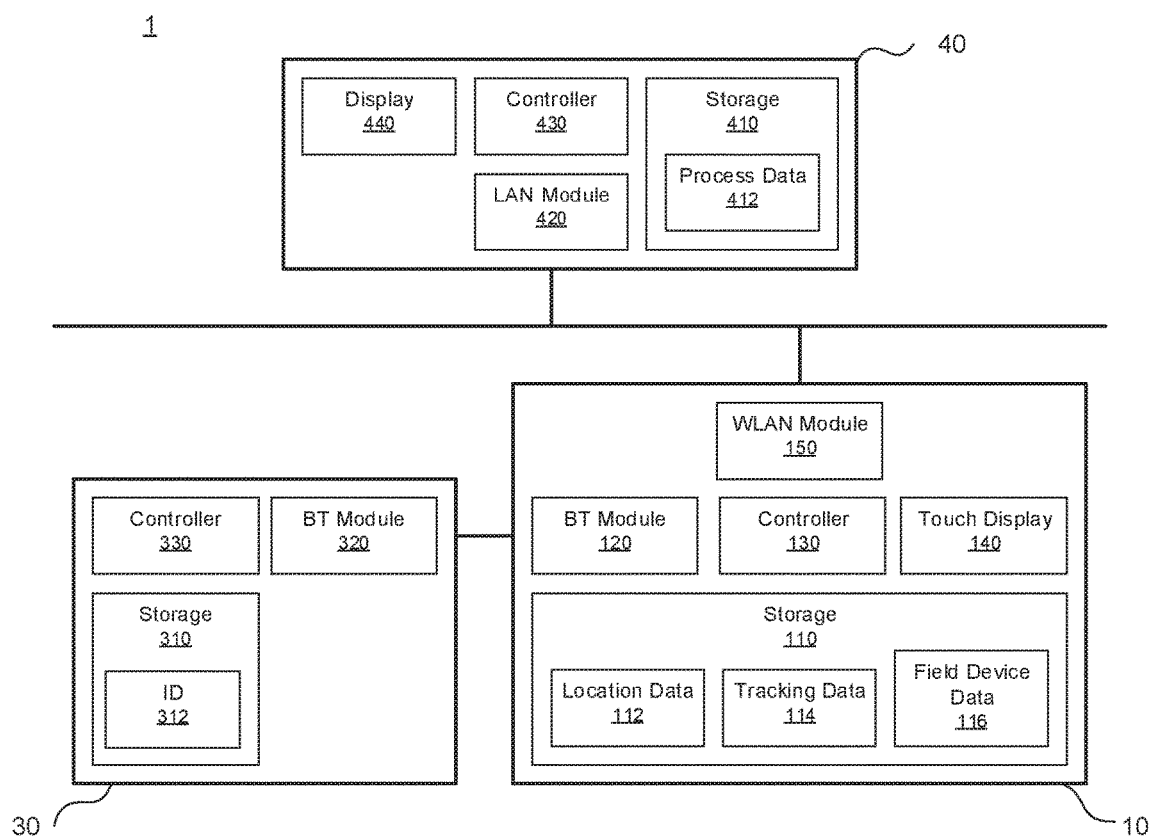
FIG. 2 shows a block diagram of the management system in accordance with one or more embodiments of the invention.

FIG. 2 shows a block diagram of the management system 1 in accordance with one or more embodiments of the invention.

In one or more embodiments of the invention, the mobile terminal 10 comprises a storage 110; a Bluetooth (BT) module 120; a controller 130; a touch display 140; and a WLAN module 150. The storage 110, BT module 120, controller 130, touch display 140, WLAN module 150, may be implemented in hardware (e.g., circuitry) or a combination of hardware and software.

The storage 110 may be of any size or type (e.g., memory, hard drive, etc.). In the example shown in FIG. 2, the storage 110 stores location data 112; tracking data 114; and field device data 116. The location data 112 represents a map of the plant facility and the locations of the beacon transmitters 30 on the map. The tracking data 114 represents a history of the current positions calculated in the mobile terminal 10. The field device data 116 represents a name of the field device 20 associated with the ID transmitted from the beacon transmitters 30. The name of the field device 20 may be any kind of string including a character, a number, and/or a symbol, that identifies the field device 20 (for example, a serial number, a manufacture's name, globally/universally unique identifier or G/UUID, TagID, etc.). In one or more embodiments of the invention, a unique ID of the field device 20 may be further associated with the name of the field device 20 and/or the ID transmitted from the beacon transmitter 30. In this case, the unique ID of the field device 20 is used to identify the field device in the management system 1, and the name of the field device 20 is used to be displayed on a screen. Those data may be represented in any type of data structure.

In one or more embodiments of the invention, the location data 112, the tracking data 114, and the field device data 116 may be stored in the storage 110 in advance. However, those data may be stored in a remote server such as the server device 40 or any remote server and may be obtained via a network on request basis. Alternatively, those data may be exchanged between the mobile terminal 10 and the server device 40 or the remote server via a network in real time or periodically.

The BT module 120 may receive the beacon signal broadcast from the beacon transmitter 30. The BT module 120 may also provide a function to calculate the strength of the received beacon signal.

The controller 130 may comprise one or more processors, memories, graphics chips, data buses, and any other circuitry required or useful for operations performed on the mobile terminal 10 according to one or more embodiments of the invention. The controller 130 may execute the operations by loading one or more programs (e.g., from the memory or the storage 110) and execute instructions represented in the programs. The controller 130 may also control the operations of other components/modules (either hardware or software) installed on the mobile terminal 10 but not shown in FIG. 2. The operations executed by the controller 130 are discussed in detail below with reference to the sequence diagrams shown in FIGS. 3-4.

The touch display 140 shows information on a screen in response to instructions from the controller 130. The touch display 140 may also accept inputs from a user (e.g., a field worker) for selecting an item displayed on the screen.

The WLAN module 150 may transmit/receive a wireless signal to/from the access point 50 in conformity with any wireless communication standard such as IEEE 802.11 so that the device terminal 10 may communicate with the device server 40.

Although FIG. 2 shows the mobile terminal 10 as having five components 110-150, the mobile terminal 10 may have more or fewer components. For example, the mobile terminal 10 may further comprise a GPS module, a near field communication module, or a wide area network (WAN) module. In one or more embodiments of the invention, the near field communication module or the WAN module may be used to communicate with the server device 40 instead of the WLAN module 150.

In one or more embodiments of the invention, the beacon transmitter 30 comprises a storage 310; a BT module 320; and a controller 330. The storage 310, BT module 320, and controller 330 may be implemented in hardware (e.g., circuitry) or a combination of hardware and software.

The storage 310 may be of any size or type (e.g., memory, hard drive, etc.). The storage 310 stores an ID 312 that is uniquely assigned to the beacon transmitter 30 and that identifies the field device 20 to or into which the beacon transmitter 30 attached or embedded.

The BT module 320 may broadcast a beacon signal in conformity with the standard of BLE. In one or more embodiments of the invention, the BT module 320 may broadcast the beacon signal comprising the ID 312, which identifies the field device 20 to or into which the beacon transmitter 30 attached or embedded.

The controller 330 may be formed with one or more processors, memories, data buses, and any other circuitry required or useful for operations performed on the beacon transmitter 30 according to one or more embodiments of the invention. The controller 330 may execute the operations by loading a program (e.g., from the memory or the storage 310) and executing instructions represented in the program. The controller 330 may also control operations of other components/modules (either hardware or software) installed on the beacon transmitter 30 but not shown in FIG. 2. The operations executed by the controller 330 are discussed in detail below with reference to the sequence diagrams shown in FIGS. 3-4.

Although FIG. 2 shows the beacon transmitter 30 as having three components 310-330, the beacon transmitter 30 may have more or fewer components.

In one or more embodiments of the invention, some of the beacon transmitters 30 may be installed at any location in the plant facility independently of the field device 20. Increasing the number of beacon transmitters 30 may improve accuracy of calculating the location of the mobile terminal 10. The location and the number of the beacon transmitters 30 may be determined depending on the scale and complexity of the plant facility and the accuracy requirement for tracking the mobile terminal 10 or the field worker in the plant facility. For example, if the plant facility is large or contains objects (such as walls) that block the beacon signals, increasing the number of beacon transmitters may improve the accuracy. On the other hand, too many beacon transmitters 30 installed within a small area may cause radio wave interference, which may prevent the mobile terminal 10 from making accurate calculations.

In one or more embodiments of the invention, the server device 40 comprises a storage 410; a LAN module 420; a controller 430, and a display 440. The storage 410, LAN module 420, controller 430, and display 440 may be implemented in hardware (e.g., circuitry) or a combination of hardware and software.

The storage 410 may be of any size or type (e.g., memory, hard drive, etc.). The storage 410 stores process data 412 associated with the ID 312 that identifies the field device 20 deployed in the plant facility. As discussed above, the process data 412 may represent, for example, temperature, pressure, flow rate, or valve status of or around the field device 20.

The LAN module 420 may transmit/receive a signal to/from the mobile terminal 10 via the network and the access point 50. The LAN module 420 may also communicate with the field device 20 via the network and collect the process data from each field device 20.

The controller 430 may be formed with one or more processors, memories, data buses, and any other circuitry required or useful for operations performed in the server device 40 according to one or more embodiments of the invention. The controller 430 may execute the operations by loading a program (e.g., from the memory or the storage 410) and executing instructions represented in the program. The controller 430 may also control operations of other components/modules (either hardware or software) installed on the server device 40 but not shown in FIG. 2. The operations executed by the controller 430 are discussed in detail below with reference to the sequence diagrams shown in FIGS. 3-4.

The display 440 shows information on a screen in response to the instructions from the controller 430. In one or more embodiments of the invention, the display 440 allows a worker in a server room to monitor other field workers' locations or the conditions of the field devices 20 via the display 440.

In one or more embodiments of the invention, one or more components of the server device 40 may be located on different computing devices connected by a network of any size and any topology having wired and/or wireless segments.

Although FIG. 2 shows the server device 40 as having four components 410-440, the server device 40 may have more or fewer components. For example, the server device 40 may further comprise a user interface module for a keyboard and/or a mouse and an alert module that outputs a visual or audible alert in case of emergency.

Figure 3:
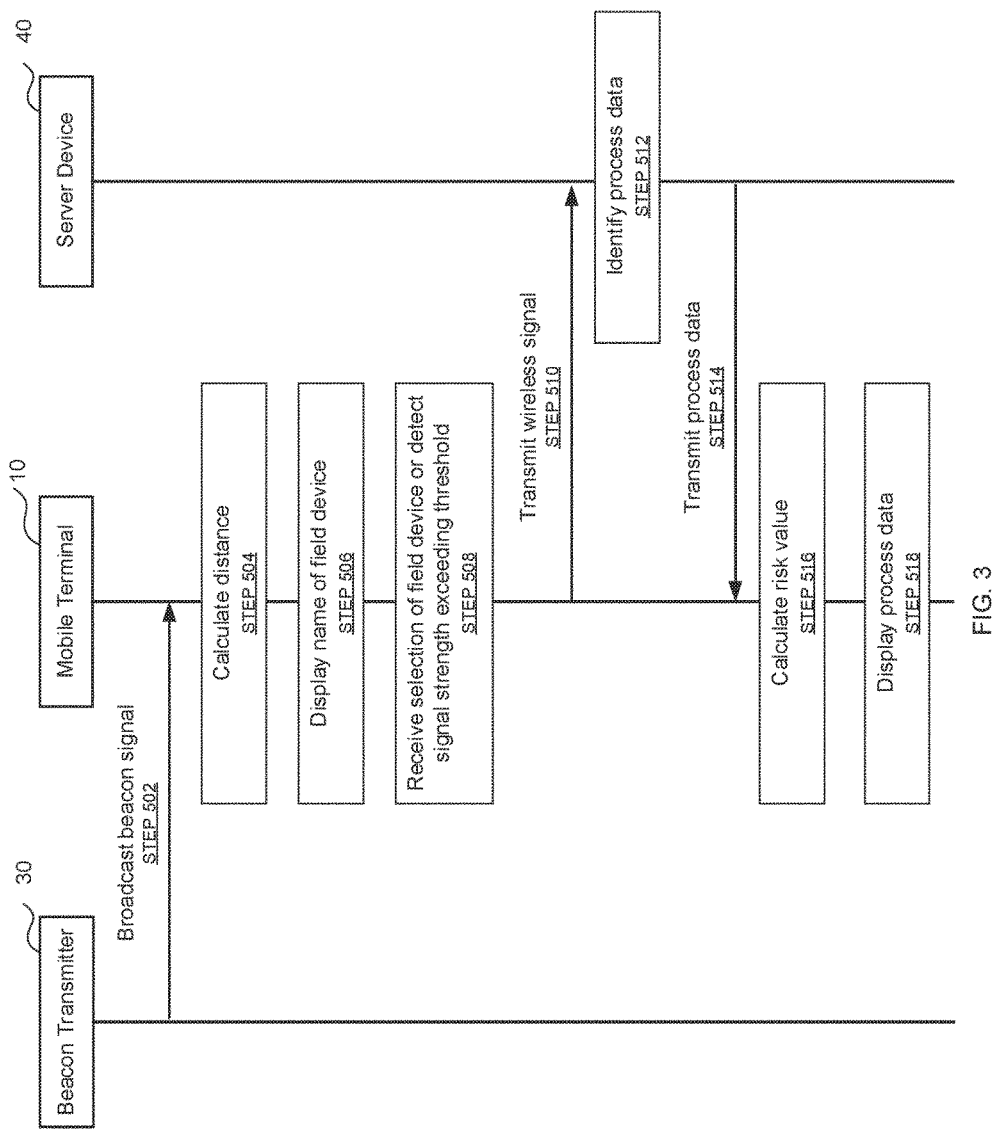
FIGS. 3-4 each show a sequence diagram of operations performed by the management system in accordance with one or more embodiments of the invention.

FIG. 3 shows a sequence diagram of operations performed by the management system 1 in accordance with one or more embodiments of the invention. One or more of the operations in FIG. 3 may be performed by the mobile terminal 10, the beacon transmitter 30, or the server device 40 of the management system 1, discussed above in reference to FIG. 1 and FIG. 2. In one or more embodiments of the invention, one or more of the operations shown in FIG. 3 may be omitted, repeated, and/or performed in a different order than the order shown in FIG. 3. Accordingly, the scope of the invention should not be considered limited to the specific arrangement of operations shown in FIG. 3.

Initially, the BT module 320 of the beacon transmitter 30 broadcasts a beacon signal comprising the ID 312 associated with the field device 20 (STEP 502). The BT module 120 of the mobile terminal 10 receives the beacon signal, and the controller 130 of the mobile terminal 10 calculates the distance from the beacon transmitter 30 based on the strength of the beacon signal (STEP 504). The controller 130 may use any known technique to calculate the distance based on the signal strength (e.g., Received Signal Strength Indicator (RSSI)). Assuming that the mobile terminal 10 receives two or more beacon signals from two or more beacon transmitters 30, the controller 130 of the mobile terminal 10 performs STEPs 502 and 504 for each beacon signal, and displays the names of the field devices 20, which are associated with and identified by the IDs 312 in the field device data 116.

FIG. 5 shows an implementation example of the screen that displays a list of the names of the field devices 20 near the mobile terminal 10. In this example, each line shows the name of the field device 20 and the distance between the mobile terminal 10 and the field device 20 (more specifically, the beacon transmitter 30 attached to or embedded into the field device 20).

Referring back to FIG. 3, when the controller 130 of the mobile terminal 10 receives a selection of one of the names on the screen via the touch display 140, or when the controller 130 detects one of the signal strength or distance exceeding a predetermined threshold (e.g., 50 cm) (STEP 508), the controller 130 transmits a wireless signal comprising the ID 312 to the server device 40 via the access point 50 (STEP 510). The LAN module 420 of the server device 40 receives the wireless signal, and the controller 430 of the server device 40 identifies the process data 412 corresponding to the ID 312 received with the wireless signal (STEP 512). Subsequently, the controller 430 transmits the identified process data to the mobile terminal 10 via the LAN module 420 (STEP 514).

When the controller 130 of the mobile terminal 10 receives the process data, the controller 130 calculates a risk value based on the process data (STEP 516). The risk value represents the degree of risk on a job or a mission performed by the field worker who holds the mobile terminal 10. The controller 130 may calculate the risk value in various ways based on the process data and work intensity of the job or the mission. Any other number of risk values may be defined. For example, in one or more embodiments of the invention, assuming that the process data is temperature, the controller 130 may define three risk values: 1 for no risk; 2 for small risk; and 3 for high risk; and calculate the risk value based on the temperature and the worker's work intensity, as defined in Heat Stress Standard ISO 7243. For example, when the temperature (process data) transmitted from the server device 40 indicates a temperature greatly exceeding the temperature suitable for his work intensity, the controller 130 calculates the risk value is 3. When the notified temperature is at or near the temperature defined in the guideline, the controller 130 calculates the risk value is 2. Otherwise, the controller 130 calculates the risk value is 1. In one or more embodiments of the invention, the work intensity of each field worker and the temperature defined in the guideline may be stored in the storage 110 of the mobile terminal 10 in advance.

Subsequently, the touch display 140 of the mobile terminal 10 displays the process data (STEP 518). The touch display 140 may display the process data in several ways, as discussed below with reference to FIGS. 6-8.

FIG. 6 shows an implementation example of the screen that displays the process data of the field device 20. In this example, the temperature (40° C.) is shown as the process data, together with the name of the field device 20 ("1FC101") and the description of the field device 20 ("Temperature Controller"). The description may be retrieved from the server device 40 with the process data or stored in the field device data 116 associated with the ID 312 in advance. Any other additional information may be shown in the screen.

Figure 7:
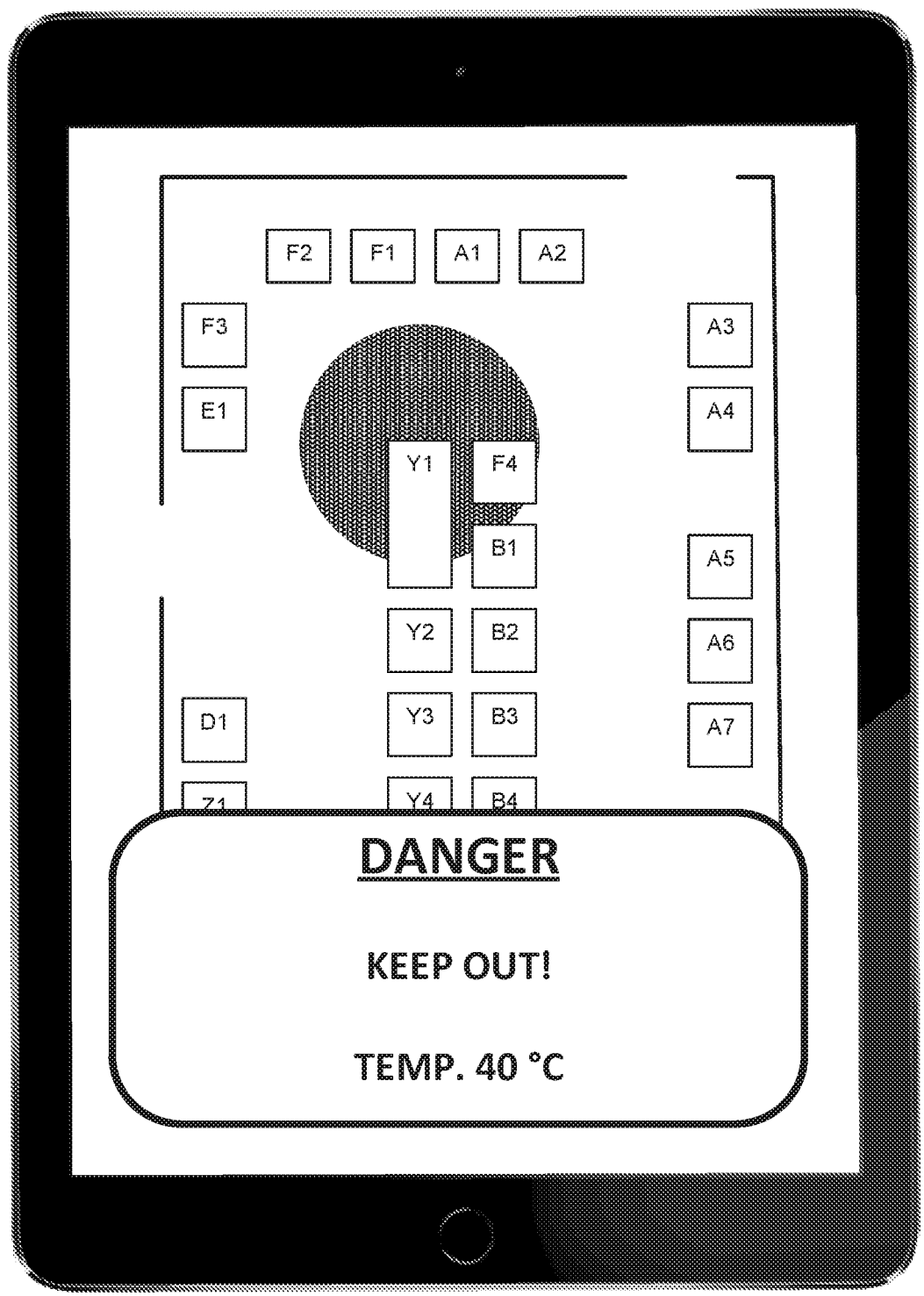

FIG. 7 shows an implementation example of the screen that displays the process data of the field device 20 together with a message. In this example, a shaded circle is drawn around the field device 20 on the map of the plant facility. The map shows the locations of the field devices 20 (or beacon transmitters 30) in the plant facility, labelled "A1" through "Z2." In one or more embodiments of the invention, the circle indicates an approximate outer boundary where the beacon signals, broadcast from the beacon transmitter 30 attached to the field device 20, can reach. For example, the circle is drawn and an alert message is shown when the controller calculates the risk value is 3, which indicates high risk for the specific field worker. In this case, an alert message such as "KEEP OUT!" may be shown with a warning sign and the temperature as the process data. Any other relevant information may be shown in the screen.

Figure 8:
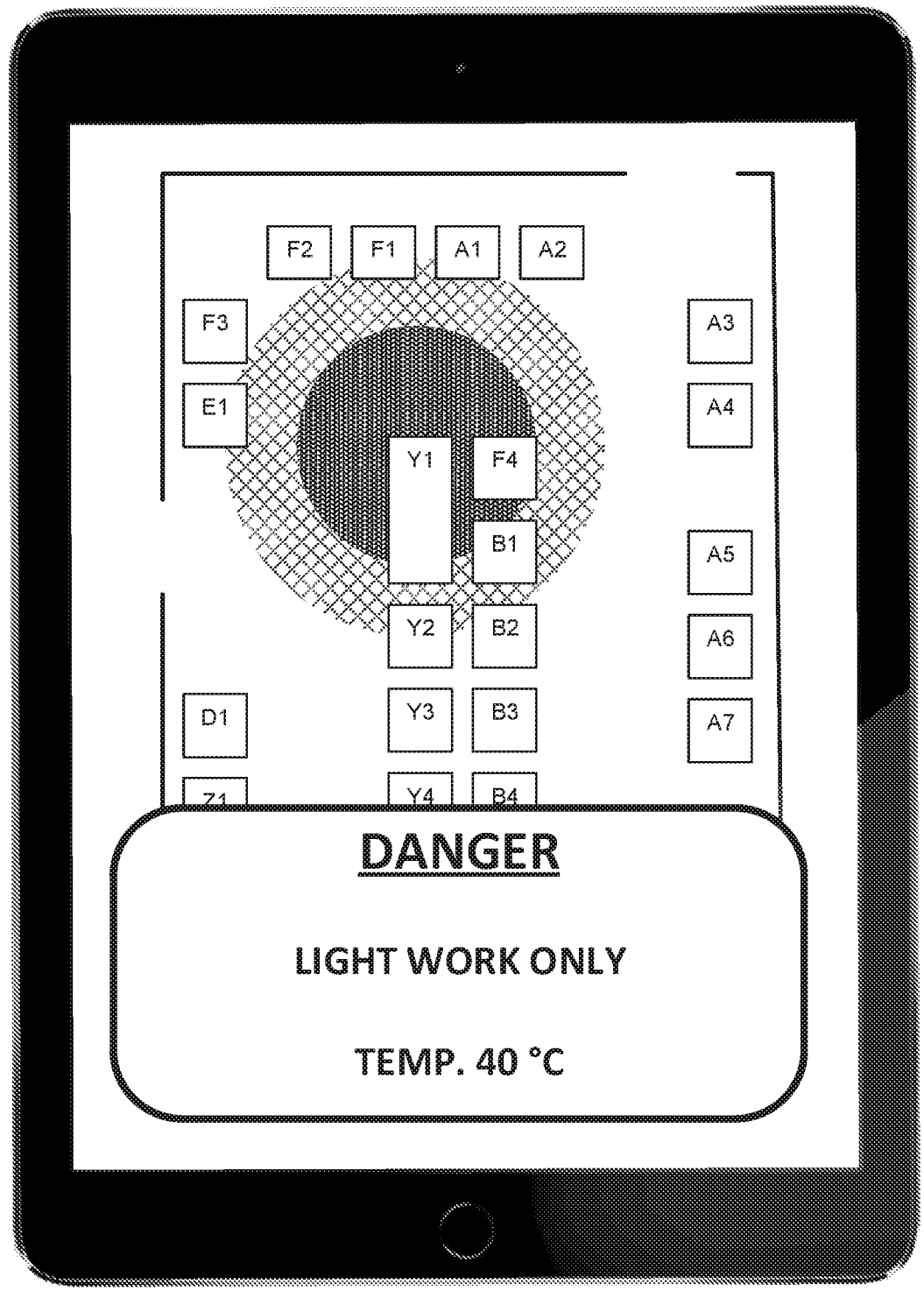

FIG. 8 shows another implementation example of the screen that displays the process data of the field device 20 together with a message. In this example, two circles with different shadings are drawn around the field device 20 on the map of the plant facility. In one or more embodiments of the invention, the inner circle indicates a restricted area where the field worker must not enter, while the outer circle indicates a partially-restricted area where the field worker may enter depending on certain conditions, such as a light work or activity. In this case, the controller 130 may calculate a plurality of risk values depending on the distance from the field device 20. For example, the controller 130 may assume that the temperature decreases by certain degrees per meter, and define three circular areas centered at the field device 20 for three ranges of the temperature. The controller 130 then calculates the risk value for each range and draws an inner circle for the risk value "3" (i.e., high risk) and an outer circle for the risk value "2" (i.e., small risk). In one or more embodiments of the invention, a message such as "Light work only," which indicates the work intensity permitted in the drawn circle, may be displayed with a warning sign and the temperature as the process data.

In one or more embodiments of the invention, the controller 130 of the mobile terminal 10 may skip STEP 516 and proceed to STEP 518 for displaying the process data, immediately after STEP 514. Alternatively, the controller 430 of the server device 40 may perform STEP 516 on behalf of the controller 130 of the mobile terminal 10 and transmit the risk value together with the process value to the mobile terminal 10. In one or more embodiments of the invention, when identifying the process data at STEP 512, the display 440 of the server device 40 may display the process data, as shown in FIG. 6. Additionally or alternatively, the display 440 may display the process data with a message, as shown in FIG. 7 and FIG. 8, after the controller 430 calculates the risk value.

According to one or more embodiments of the invention, the field devices become discoverable at large ranges. When in close proximity, the field worker can be automatically navigated to process data specific to a single piece of equipment.

In one or more embodiments of the invention, each of the screens shown in FIGS. 6-8 may have a "back" button, which allows the field worker to go back to the overview screen shown in FIG. 5.

Figure 4:
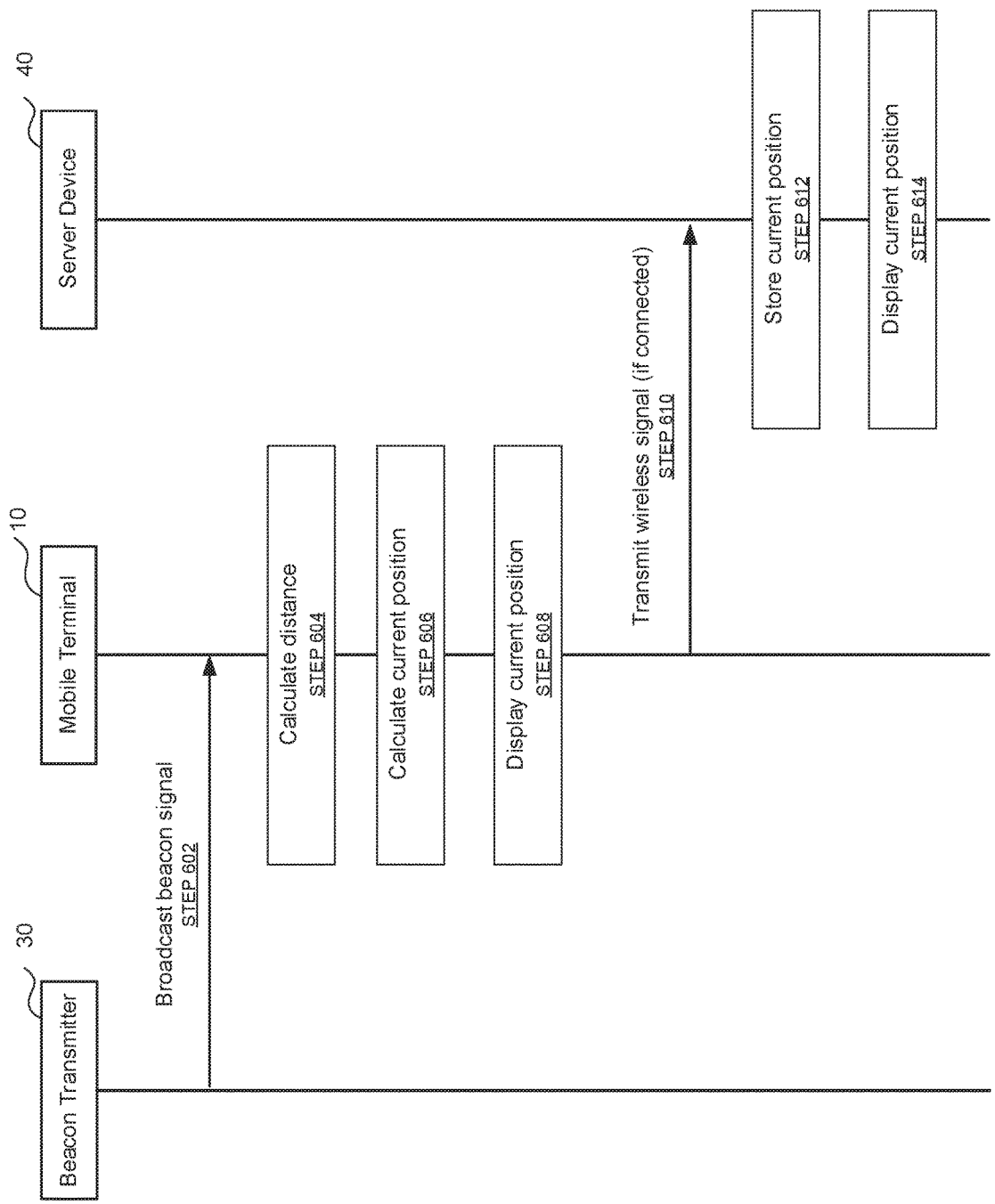

FIG. 4 shows a sequence diagram of operations performed by the management system 1 in accordance with one or more embodiments of the invention. One or more of the operations in FIG. 4 may be performed by the components of the mobile terminal 10, the beacon transmitter 30, or the server device 40 of the management system 1, discussed above in reference to FIGS. 1 and 2. In one or more embodiments of the invention, one or more of the operations shown in FIG. 4 may be omitted, repeated, and/or performed in a different order than the order shown in FIG. 4. Accordingly, the scope of the invention should not be considered limited to the specific arrangement of operations shown in FIG. 4.

Initially, the BT module 320 of the beacon transmitter 30 broadcasts a beacon signal comprising the ID 312 associated with the field device 20 (STEP 602). The BT module 120 of the mobile terminal 10 receives the beacon signal, and the controller 130 of the mobile terminal 10 calculates the distance from the beacon transmitter 30 based on the strength of the beacon signal (STEP 604). The controller 130 may use any known technique to calculate the distance based on the signal strength (e.g., RSSI). Assuming that the mobile terminal 10 receives two or more beacon signals from two or more beacon transmitters 30, the controller 130 of the mobile terminal 10 performs STEPs 602 and 604 for each beacon signal, and calculates the current position of the mobile terminal 10 based on the calculated distances (STEP 606). The controller 130 may use any known technique to calculate the current position based on the distances (or signal strengths) from the several beacon transmitters. The controller 130 may store the calculated current position as the tracking data 114. The tracking data 114 may be represented in any data structure. Subsequently, the touch display 140 of the mobile device 10 displays the current position on the map in several ways, as shown in FIGS. 9-11 (STEP 608).

Figure 9:
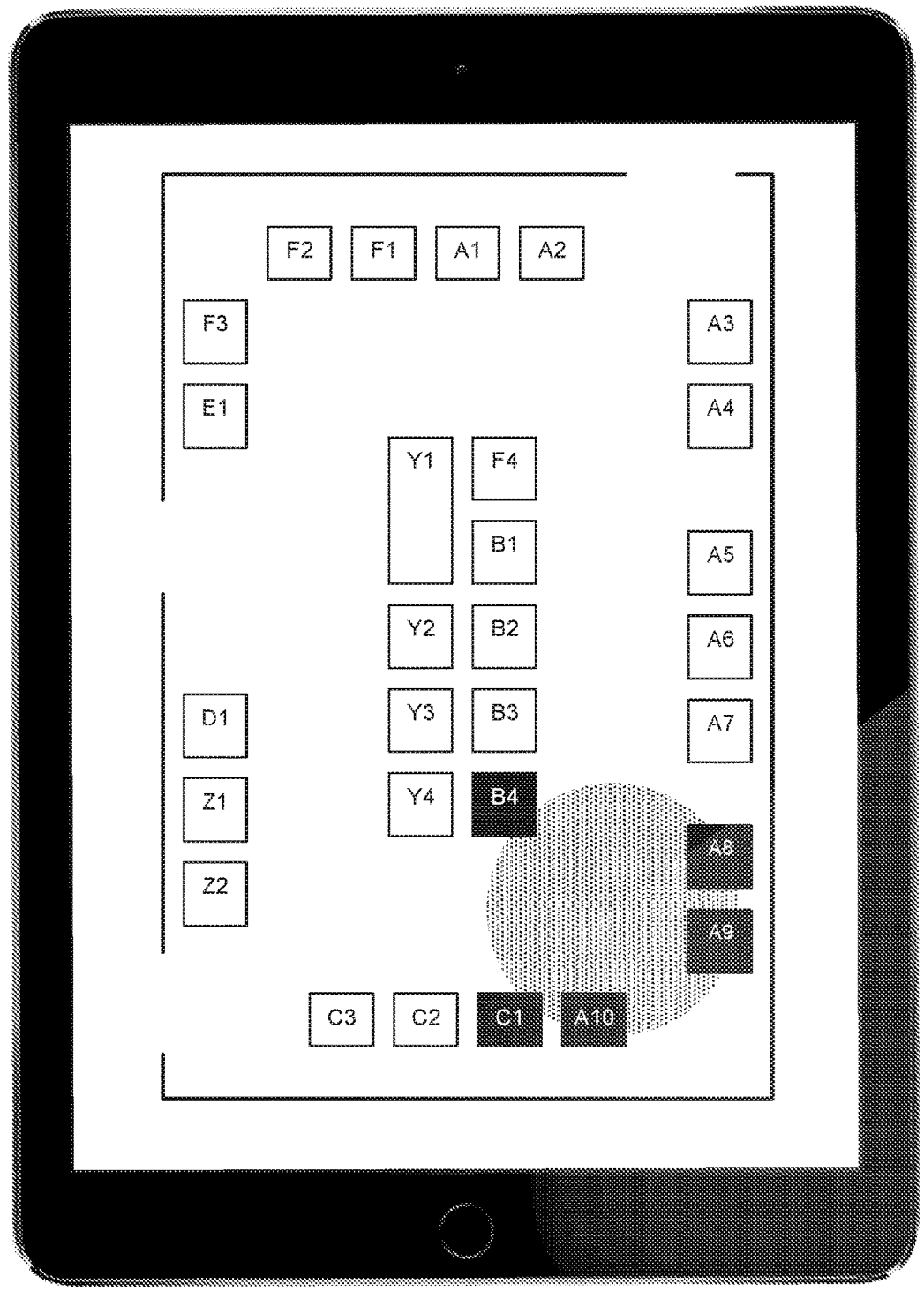

FIG. 9 shows an implementation example of the screen that displays the current position of the mobile terminal 10 with the map of the plant facility and the locations of the field devices 20 in the facility, stored as the location data 112. In this example, the mobile terminal 10 is receiving the beacon signals from five beacon transmitters 30 (i.e., "A8," "A9," "A10," "B4," and "C1") and has calculated the current position, which is the center of the shaded circle drawn on the map. The radius of the circle may indicate the degree of precision for the calculation.

Figure 10:
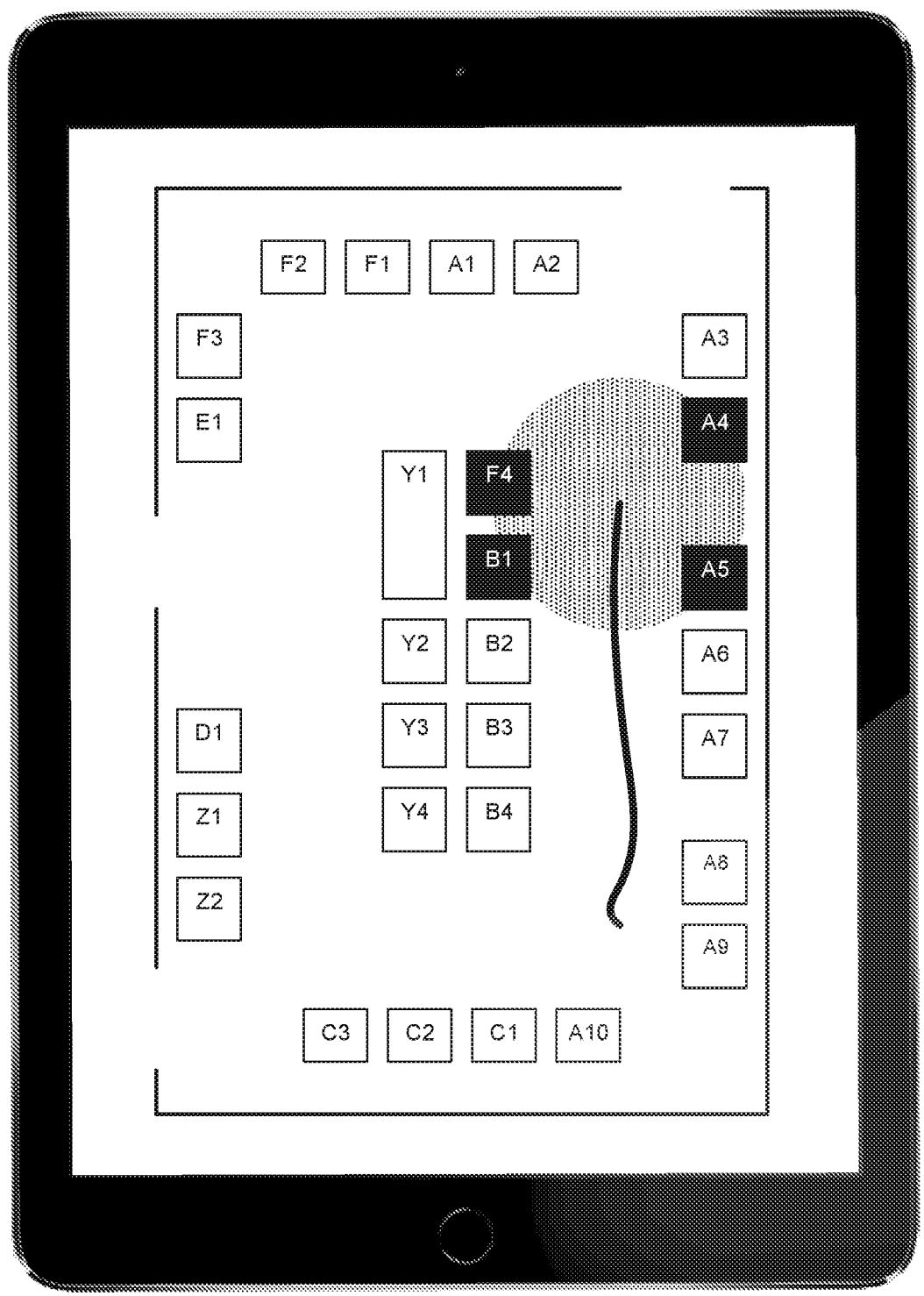

FIG. 10 shows an implementation example of the screen that displays the current position of the mobile terminal 10 and its history on the map of the plant facility. In this example, the touch display 140 shows a path that represents the transition of the position of the mobile terminal 10 on the map. Additionally, the touch display 140 shows the shaded circle that indicates the latest current position. Again, the radius of the circle may indicate the degree of precision for the calculation.

Figure 11:
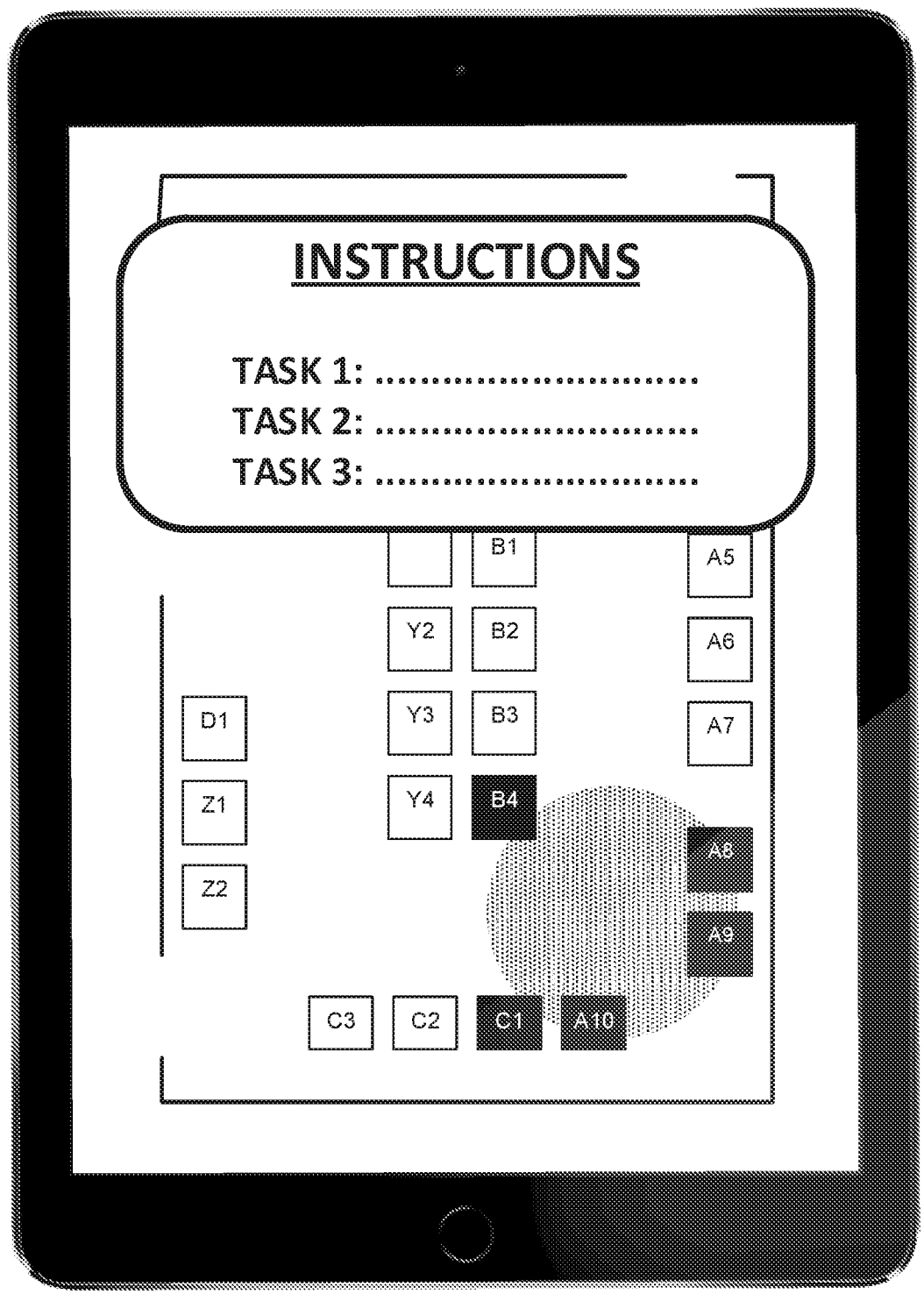

FIG. 11 shows an implementation example of the screen that displays the current position of the mobile terminal 10 with messages or instructions for the field worker on the map of the plant facility. In this example, the storage 110 of the mobile terminal 10 has stored the messages or instructions for the field worker associated with the location on the map (i.e., location data 112). When the current position of the field worker (or more specifically, the mobile terminal 10 held or worn by the field worker) approaches or has reached the location, the touch display 140 displays the messages or instructions together with the current position on the map. In one or more embodiments of the invention, an electronic document that describes locations and tasks for the field worker associated with the locations is stored in the storage 110 in advance. When the field worker reaches a location where one of the tasks must be performed, the controller 130 calculates that the current position is the location associated with the task and causes the touch display 140 to display the task.

Referring back to FIG. 4, after displaying the current position, the controller 130 of the mobile terminal 10 may transmit a wireless signal including the current position to the server device 40 via the access point 50 (STEP 610). Next, the controller 430 of the server device 40 stores the received current position in the storage 410 (STEP 612) and displays the current position of the mobile terminal 10 with the map on the display 440 (STEP 614).

When the wireless network is unavailable, STEPs 610-614 may be omitted. In this case, the mobile terminal 10 may solely and locally perform STEPs 602-608 and, when the network becomes available, transmit the stored positions to the server.

In one or more embodiments of the invention, STEPs 604-608 may be performed by the controller 430 of the server device 40. In this case, the controller 130 of the mobile terminal 10 may transmit the signal strengths of the received beacon signals with the IDs 312 to the server device 40 in real time or periodically, and the controller 430 of the server device 40 calculates the current position of the mobile terminal 10. The mobile terminal 10 then receives the calculated position from the server device 40 and displays the current position on the map.

According to one or more embodiments of the invention, the location and movement of a field worker can be tracked accurately. Such historical data may be used for improving the effectiveness of procedures or field worker pathing of the plant facility. Additionally, the historical data may be used for making a future plan for a more efficient layout of equipment in the plant facility. Furthermore, when an accident occurs in the plant, the tracking data may be used for investigate the cause of the accident.

In one or more embodiments of the invention, the mobile terminal 10 may be attached to or embedded into a fork lift, truck, drone, or any self-driving equipment. The current position of the moving equipment is calculated based on the beacon signals transmitted from the beacon transmitters and displayed with the location data representing the locations of the field devices or the beacon transmitters. The current position may be monitored by personnel in or out of the control room to identify the location of current path of a specific piece of equipment. In one or more embodiments of the invention, the history of the current position is stored and analyzed to show the efficiency of the equipment's movement in the plant facility. Further, the analysis of the historical data allows for improving the plant layout or creating an improved plant layout. The analyzed data may also be used for generating a set of key performance indicators (KPIs) on equipment cost, energy usage, and cost of product produced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A management system for a plant facility, comprising:
a server device;
a mobile terminal that communicates with the server device; and a plurality of beacon transmitters, wherein each of the beacon transmitters is attached to or embedded into a field device that measures process data or controls one or more controlled objects in the plant facility and broadcasts a beacon signal comprising an identifier that identifies the field device, wherein the mobile terminal comprises:
a mobile terminal display;
a beacon receiver that receives the beacon signals; and
a mobile terminal controller that calculates a distance from the mobile terminal to each of the beacon transmitters based on strength of the beacon signal received from each of the beacon transmitters, the server device comprises:
a server device display;
a server device storage that stores the process data collected from each of the field devices and a name and a description of each of the field devices corresponding to each of the identifiers; and
a server device controller that
receives wireless signals comprising the identifiers from the mobile terminal, and
identifies the process data, the name, and the description corresponding to each of the identifiers received with the wireless signals,
the mobile terminal controller
transmits the wireless signals to the server device with the identifiers received with the beacon signals, and at least one of the server device display and the mobile terminal display displays the calculated distances and the process data, the name, and the description of the field device identified by the server device controller.

2. The management system of claim 1, wherein
the mobile terminal further comprises a mobile terminal storage that stores location data that represents a location of each of the beacon transmitters,
the mobile terminal display displays a current location of the mobile terminal with the locations of the beacon transmitters based on the calculated distances.

3. The management system of claim 2, wherein
the mobile terminal storage further stores tracking data of the current location, and
the mobile terminal display displays the tracking data of the current location with the locations of the beacon transmitters.

4. The management system of claim 2, wherein
the server device storage further stores the location data,
the mobile terminal controller transmits the current location to the server device, and
the server device display displays the calculated current location with the locations of the beacon transmitters.

5. The management system of claim 4, wherein
the server device storage further stores tracking data of the current location, and
the server device display displays the tracking data of the current location with the locations of the beacon transmitters.

6. The management system of claim 1, wherein
the server device storage further stores location data that represents a location of each of the beacon transmitters,
the mobile terminal controller
transmits the calculated distances to the server device, and
the server device display displays a current location of the mobile terminal with the locations of the beacon transmitters based on the calculated distances.

7. The management system of claim 6, wherein
the server device storage further stores tracking data of the current location, and
the server device display displays the tracking data of the current location with the locations of the beacon transmitters.

8. The management system of claim 1, wherein
the mobile terminal further comprises a mobile terminal storage that stores field device data that associates each of the identifiers with a string that indicates the field device,
the mobile terminal display displays the calculated distances with the strings of the field devices.

9. The management system of claim 8, wherein
in response to each of the wireless signals, the server device controller transmits to the mobile terminal the process data corresponding to the identifier received with the wireless signal, and
the mobile terminal display displays the process data received from the server device controller with the strings of the field devices.

10. The management system of claim 8, wherein
when one of the strings is selected by a user of the mobile terminal, the mobile terminal controller transmits to the server device the wireless signal comprising the identifier associated with the selected string, and
when the strength of one of the beacon signals received by the mobile terminal exceeds a predetermined threshold, the mobile terminal controller transmits to the server device the identifier of the one of the received beacon signals.

11. The management system of claim 9, wherein
the server device controller
calculates a risk value based on the identified process data, and
transmits the risk value to the mobile terminal, and
the mobile terminal display displays a message based on the received risk value.

12. A method for managing a plant facility, comprising:
broadcasting beacon signals by a plurality of beacon transmitters, wherein each of the beacon transmitters is attached to or embedded into a field device that measures process data or controls one or more controlled objects in the plant facility, and each of the beacon signals comprises an identifier that identifies the field device;
receiving the beacon signals by a mobile terminal;
transmitting, from the mobile terminal to a server device, wireless signals with the identifiers received with the beacon signals;
calculating a distance from the mobile terminal to each of the beacon transmitters based on strength of the beacon signal received from each of the beacon transmitters;
identifying the process data collected from each of the field devices and a name and a description of each of the field devices stored in the server device corresponding to each of the identifiers received with the wireless signal; and
displaying the calculated distances and the identified process data, name, and description on at least one of the server device and the mobile terminal.

13. The method of claim 12, further comprising
based on the calculated distances, displaying, on the mobile terminal, a current location of the mobile terminal with locations of the beacon transmitters represented in location data stored in the mobile terminal.

14. The method of claim 13, further comprising
displaying, on the mobile terminal, with the locations of the beacon transmitters, tracking data of the current location stored in the mobile terminal.

15. The method of claim 13, further comprising
transmitting the current location from the mobile terminal to the server device, and
displaying, on the server device, the current location with the locations of the beacon transmitters stored in the server device.

16. The method of claim 15, further comprising
displaying, on the server device, with the locations of the beacon transmitters, tracking data of the current location stored in the server device.

17. The method of claim 12, further comprising
displaying the calculated distances with strings of the field devices by field device data stored in the mobile terminal, that associates each of the identifiers with the string of the field device.

18. The method of claim 17, further comprising
in response to each of the wireless signals, transmitting, from the server device to the mobile terminal, the process data corresponding to the identifier received with the wireless signal, and
displaying on the mobile terminal the process data received from the server device with the strings of the field devices.

19. The method of claim 17, further comprising
when one of the strings is selected by a user of the mobile terminal, transmitting from the mobile terminal to the server device the wireless signal comprising the identifier associated with the selected string, and
when the strength of one of the beacon signals received by the mobile terminal exceeds a predetermined threshold, transmitting to the server device the identifier of the one of the received beacon signals.

20. The method of claim 18, further comprising:
calculating a risk value based on the identified process data;
transmitting the risk value to the mobile terminal; and
displaying on the mobile terminal a message based on the received risk value.

* * * * *